June 6, 1967 G. SCHENK 3,324,286
REVERSIBLY OPERABLE DRIVE MEANS FOR CALCULATING MACHINES
Filed Dec. 29, 1964 2 Sheets-Sheet 1

INVENTOR
GUSTAV SCHENK
BY *[signature]*
ATTORNEY

June 6, 1967 G. SCHENK 3,324,286
REVERSIBLY OPERABLE DRIVE MEANS FOR CALCULATING MACHINES
Filed Dec. 29, 1964 2 Sheets-Sheet 2
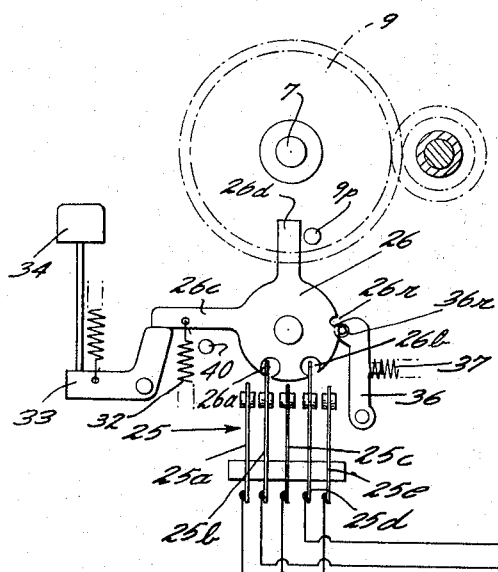
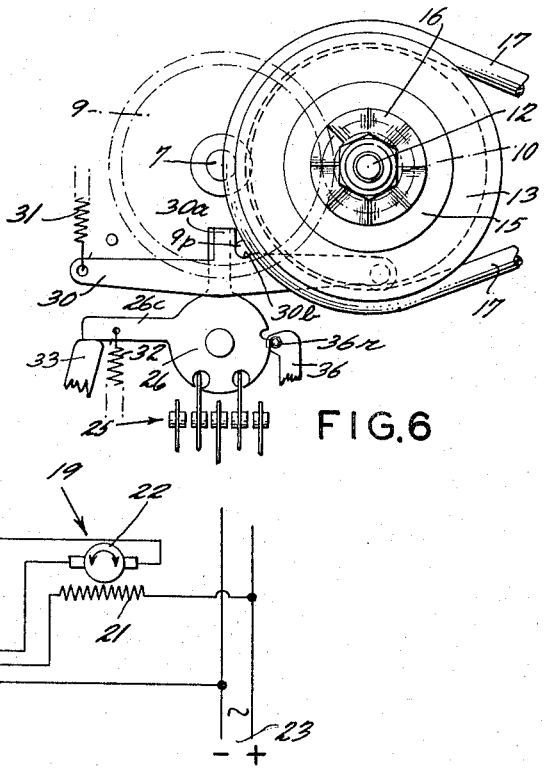
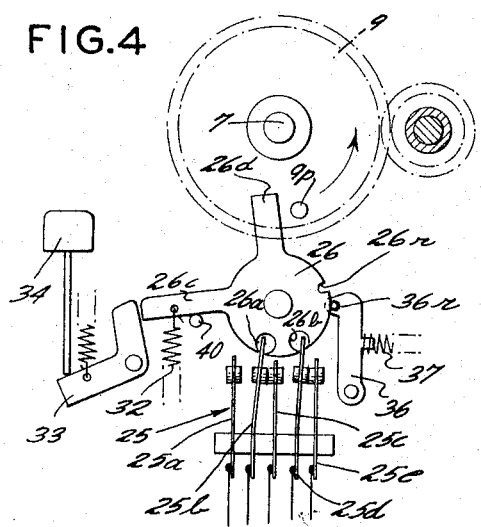
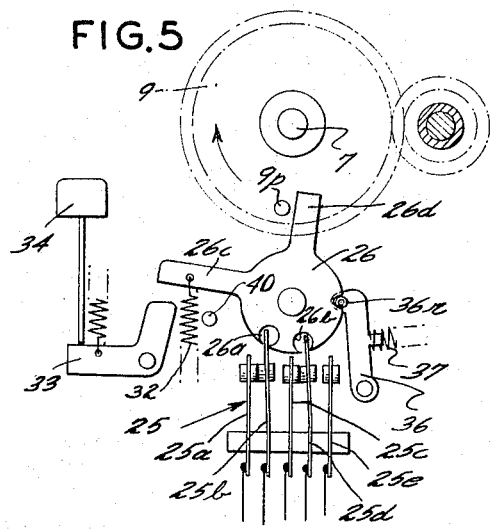
INVENTOR.
GUSTAV SCHENK
BY
ATTORNEY

United States Patent Office 3,324,286
Patented June 6, 1967

---

3,324,286
REVERSIBLY OPERABLE DRIVE MEANS FOR CALCULATING MACHINES
Gustav Schenk, Darmstadt, Germany, assignors to Monroe Calculating Machine Company—Holland N.V., Amsterdam, Netherlands, a corporation of the Netherlands
Filed Dec. 29, 1964, Ser. No. 421,956
14 Claims. (Cl. 235—62)

This invention relates to reversible driving means for calculating machines, and more particularly to means for controlling the direction of rotation of a reversible motor to drive a reciprocably operable mechanism of the machine.

Prior art motor driven calculating machines having reciprocably operable mechanism such as actuator racks employ a motor which is operated unidirectionally. In the most usual construction, cam means on the main drive shaft of the machine oscillates a cam follower which, through a suitable transmission train, controls the racks in a forward and return stroke for each revolution of the drive shaft.

The above prior art drive means, which is in general use, requires a speed governor for the unidirectional motor to prevent the parts from being driven above a critical operating speed. Furthermore, a clutch is usually employed for coupling and uncoupling the drive shaft and the motor in start and stop operations. Obviously, it would be advantageous to simplify the mechanism by eliminating the above-noted parts.

It is accordingly the primary object of the invention to simplify the drive means for reciprocably operable motor driven mechanism of a calculating machine.

More specifically, it is an object to eliminate the speed governor for the motor and also to eliminate the clutch which is usually employed to couple and uncouple the main drive shaft to the motor.

To achieve the above objects, a reversible motor is operated in one direction to drive reciprocably operable actuator racks in the forward stroke of a cycle of operation. At the end of the forward stroke means is operable to reverse the motor which then drives the actuators in the return stroke thereby completing a cycle. On plural cycle operation, the motor will not operate above a given speed because of the reversal during each cycle, and therefore the speed governor is unncessary. Furthermore, there is no clutch means operable to couple and uncouple the drive shaft with the motor in start-stop operations which operations are effected by motor control alone. The invention however will best be understood from the following description of a preferred embodiment with reference to the accompanying drawings in which:

FIG. 3 is a combined mechanical and electrical schematic showing the motor control means in normal position.

FIGS. 4 and 5 are schematics similar to FIG. 3 of the motor control means in operated positions.

FIG. 6 is a detail view of the stopping means.

Figure 1:
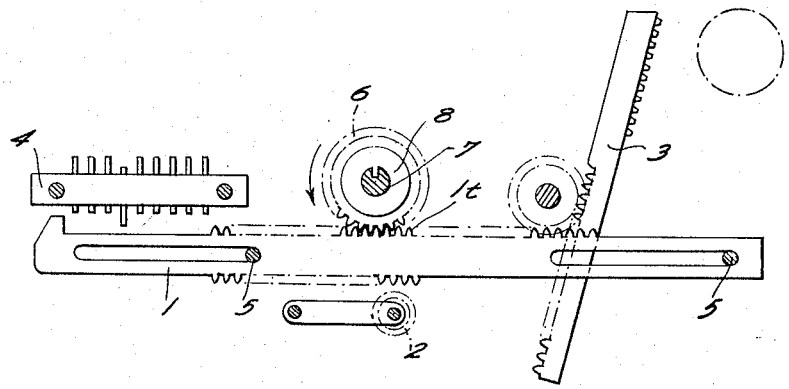
FIG. 1 is a schematic side elevation of reciprocably operable actuator racks and associated mechanism of a calculating machine.
Figure 2:
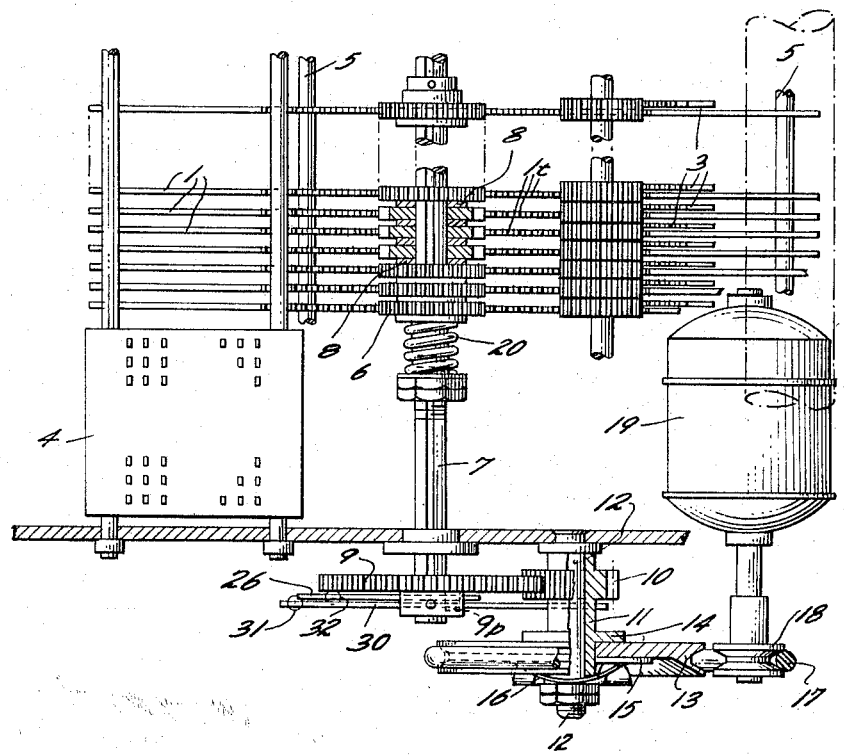
FIG. 2 is a plan view partly in section of the actuator drive means of the invention.

With reference to FIGS. 1 and 2, the calculating machine includes reciprocably operable actuator racks 1 for registering values in accumulator register 2 and for adjusting type members 3 in accordance with the registered values. The extent of the forward strokes of racks 1 are controlled in accordance with values entered in a pin carriage 4 or by the wheel gears of register 2 in total taking operations.

The control of the engagement of register 2 with racks 1, the control of the racks by pin carriage 4, and the control of type bars 3 in a printing operation are all old and well known in the art and no description thereof is necessary for an understanding of the invention.

Actuator racks 1 are supported for longitudinal reciprocatory movement by rods 5 which pass transversely through longitudinal slots in the racks and which are supported in the side frames of the machine. Drive means for reciprocating the racks includes gears 6 engaging teeth 1t along the upper edges of the racks. Gears 6 are loosely mounted on a drive shaft 7 which extends transversely above the racks and which is journaled in the machine side frames.

Friction means is adapted to transmit the drive from shaft 7 to gears 6. The friction means comprises washers 8 splined on shaft 7 between each adjacent pair of gears 6. A compression spring 20 holds the gears and washers in frictional engagement. Accordingly, upon counterclockwise rotation of shaft 7, gears 6 will drive racks 1 toward the right in forward strokes, and clockwise rotation of the shaft will return the racks. Shaft 7 is driven counterclockwise, as later described, an angular distance sufficient for gears 6 to drive racks 1 to their digit 9 registering positions and an equal distance clockwise to restore the racks. Therefore when a rack is arrested in a 0–8 registering position, the friction drive to that rack will yield as shaft 7 completes its rotation.

Shaft 7 is driven by a train including a spur gear 9 fast on the shaft exteriorly of the machine right side frame, and a pinion gear 10 engaging gear 9. Gear 10 is integral with a sleeve 11 rotatably mounted on a stub shaft 12 fixed in the machine side frame. A pulley 13 is rotatably mounted on sleeve 11 and is trapped between a flange 14 of the sleeve and a friction disc 15 loosely mounted on the sleeve. A leaf spring 16 presses disc 15 against pulley 13 which in turn is pressed against flange 14 thereby providing a friction drive between pulley 13 and pinion gear 10. Means for driving pulley 13 comprises a belt 17 which is driven by a pulley 18 on the shaft of a reversible electric motor 19.

When racks 1 are in normal restored position, means is operable to locate shaft 7 and gear 9 in a normal position of rest. Such means comprises a horizontally disposed arm 30 (FIG. 6) pivotally mounted at its right end to the machine framing at the right of gear 9 and urged upwardly by a spring 31. A lug 30a extends upwardly from arm 30 intermediate its ends and a pin 9p on gear 9 normally engages the right edge of lug 30a and a recess 30b in the upper edge of arm 30 adjacent the lug to locate the parts in normal position.

Gear 9 will be rotated counterclockwise from normal position by motor 19 to drive racks 1 in their forward strokes. This operation will be terminated when pin 9p engages the left side of lub 30a to arrest rotation of gear 9 at which time the excursions of the racks will be completed and the motor will be reversed as later described. The reversal, however, will not be immediately effective and the friction drive between pulley 13 and gear 10 will slip. Gear 9 will now be driven clockwise and racks 1 will have been restored when pin 9p again engages the right side of lug 30a and recess 30b to complete a cycle.

Motor 19 may be any one of a number of reversible types. However, a type most readily responsive to reversal and applicable for use with the control devices of the invention is of the universal A.C.–D.C. type. In this type of motor, the armature winding is connected by commutator means in series with the field winding. If the polarity of the connections to the armature winding is reversed with respect to the field winding, the direction of rotation of the motor will be reversed.

Referring now to FIG. 3, motor 19 comprises a field winding 21 and an armature winding 22. The circuit connections to an A.C. or D.C. power source 23 are controlled by a reversing switch 25 which is shown in "off" position. The switch comprises five leaf spring contacts 25a–25e. These contacts are connected to field winding 21, armature winding 22, and power source 23 as clearly shown.

Contacts 25b and 25d extend upwardly and engage respective recesses 26a and 26b in the edge of a control disc 26 which is rotatably mounted on the machine framing. Normally disc 26 is held in a central "off" position (FIG. 3) by means later described. When in this central position all of the contacts 25a–25e are open and there is no circuit to motor 19. When disc 26 is rotated counterclockwise (FIG. 4) from central position, as later described, contacts 25b, 25c and 25d, 25e will be closed to complete a circuit to operate motor 19 in a given direction. When disc 26 is rotated clockwise (FIG. 5) from central position, contacts 25a, 25b and 25c, 25d will be closed to complete a circuit which will operate the motor in the reverse direction.

Disc 26 includes a leftwardly extending arm 26c and an upstanding arm 26d. Disc 26 is biased counterclockwise by a spring 32 but is normally held in central position (FIG. 3) by arm 26c engaging an upstanding arm of a bell crank 33 which is spring held clockwise with a rightwardly extending arm thereof engaging the end of the stem of a retracted key 34. With the parts in normal position, pin 9p will be immediately to the right of arm 26d (FIG. 3) and will engage the right edge of lug 30a and recess 30b of arm 30 (FIG. 6) as previously described.

Detent means for disc 26 comprises an upstanding arm 36 which is pivotally mounted at its lower end and which has an antifriction roller 36r at its upper end. A relatively strong spring 37 biases arm 36 counterclockwise to hold roller 36r in engagement with the edge of disc 26. When disc 26 is in central position (FIG. 3), a recess 26r in the edge of the disc is counterclockwise from roller 36r.

*Operation*

Upon depression of key 34, bell crank 33 will be rocked counterclockwise from the position of FIG. 3 to release disc 26 for counterclockwise movement by spring 32 to the position of FIG. 4 where it will be arrested by a limit stop 40. Accordingly, switch 25 will be operated to close the previously described circuit for motor 19. Motor 19 will be operated in the direction to drive gear 9 counterclockwise; and therefore racks 1 will be driven in a forward stroke.

Just prior to the counterclockwise arrest of gear 9 by engagement of pin 9p with lug 30a, pin 9p will engage arm 26d and rotate disc 26 clockwise to the position of FIG. 5. This will operate switch 25 to reverse motor 19 as previously described. Disc 26, when moved to clockwise position, will bring recess 26r into engagement with roller 36r of detent arm 36. Arm 36 is biased by relatively strong spring 37, and therefore disc 26 will be held against the counterclockwise urge of spring 32.

With motor 19 reversed, gear 9 will be driven clockwise from the position of FIG. 5 and racks 1 will be driven in a return stroke. When gear 9 is restored to the position of FIGS. 3, 6, pin 9p will centralize disc 26 if key 34 has been released and the machine will be brought to rest. If, however, key 34 is held depressed, disc 26 will pass through central position to the position of FIG. 4 and the motor will be reversed to start another reciprocatory cycle of racks 1.

We claim:

1. In a calculating machine having a reciprocably operable mechanism:
    a reversible electric motor;
    circuit means including switching means adjustable to a first position for operating said motor in one direction and to a second position for operating said motor in the reverse direction;
    means operable by said motor when operated in said one direction to drive said mechanism in a forward stroke of operation and when operated in said reverse direction to drive said mechanism in a return stroke; and
    means operable in time with the forward and return strokes respectively of said mechanism to adjust said switching means to its second and first positions.

2. In a calculating machine having a reciprocably operable mechanism;
    a reversibly operable electric motor;
    circuit means includnig switching means adjustable to a first position for operating said motor in one direction and to a second position for operating said motor in the reverse direction;
    a drive train driven by said motor upon operation in said one direction for driving said mechanism in a forward stroke of operation and upon operation in said reverse direction for driving said mechanism in a return stroke of operation; and
    means operable in time with the operation of said drive train to adjust said switching means alternately to said first and second positions.

3. In a calculating machine having a reciprocably operable mechanism:
    a reversible electric motor;
    circuit means including switching means for operating said motor in one or in the reverse direction;
    a drive train operable by said motor when operated in said one direction to drive said mechanism in the forward stroke of a cycle of operation and operable by said motor when operated in the reverse direction to drive said mechanism in the return stroke of said cycle; and
    means operable in time with the operation of said drive train in driving said mechanism in said forward stroke to operate said switching means to reverse said motor and operable in time with the operation of said drive train in driving said mechanism in said return stroke to reverse said motor.

4. The invention according ot claim 3:
    including means for arresting movement of said drive train in a given position upon operation of said motor in said one direction and in a given position upon operation of said motor in the reverse direction.

5. The invention according to claim 4:
    including yieldable drive means between said motor and said drive train.

6. The invention according to claim 5:
    wherein said yieldable drive means is frictional.

7. The invention according to claim 4:
    wherein said means for operating said switching means is operable immediately prior to arrest of said drive train.

8. The invention according to claim 3:
    including yieldable drive means between said reciprocably operable mechanism and said drive train.

9. In a calculating machine having a reciprocably operable mechanism:
    a cyclic reversibly operable drive train for said mechanism operable in one direction during each cycle to drive said mechanism a forward stroke and in the reverse direction in a return stroke;
    a reversibly operable electric motor for said drive train;
    a first circuit for operating said motor in one direction;
    a second circuit for operating said motor in the reverse direction;
    switching means adjustable to a first position to close said first circuit, to a second position to close said second circuit and to a third position wherein both of said circuits are broken;
    starting means operable to adjust said switching means to said first position;
    means operable in time with said drive train upon operation in said one direction to adjust said switching means to said second position; and means operable in time with said drive train upon operation in said reverse direction to adjust said switching means to said circuit breaking position.

10. In a calculating machine having a series of reciprocably operable actuator racks:

a reversible electric motor;

circuit means including switching means for operating said motor in one or in the reverse direction;

a driveshaft;

gears on said drive shaft operable to drive said racks in forward strokes upon rotation of said shaft in one direction and in return strokes upon rotation in the reverse direction;

means driven by said motor for driving said shaft in said one or in said reverse direction upon operation of said motor in said one or in said reverse direction; and means operable upon rotation of said shaft in said one direction to a given position to operate said switching means to reverse said motor and upon rotation of said shaft in said reverse direction to reverse said motor.

11. The invention according to claim 10:
including means for arresting rotation of said shaft in a given position upon rotation in said one direction and in a given position upon rotation in said reverse direction.

12. The invention according to claim 11:
wherein said means driven by said motor for driving said shaft includes a gear on said shaft; and said means for operating said switching means includes a pin on said gear.

13. The invention according to claim 12:
wherein said means for arresting rotation of said shaft includes a blocking member in the path of said pin.

14. The invention according to claim 13:
wherein said means driven by said motor includes yieldable friction means between said gear and said motor.

References Cited

UNITED STATES PATENTS

| | | | |
|---|---|---|---|
| 1,136,165 | 4/1915 | Perkins. | |
| 1,668,880 | 5/1928 | Vallen. | |
| 1,822,031 | 9/1931 | Hoffmeister | 235—62 X |
| 2,935,166 | 5/1960 | Dodsworth | 192.02 |

STEPHEN J. TOMSKY, *Primary Examiner.*